Oct. 9, 1945.    G. A. LYON    2,386,235
WHEEL STRUCTURE
Filed June 21, 1943
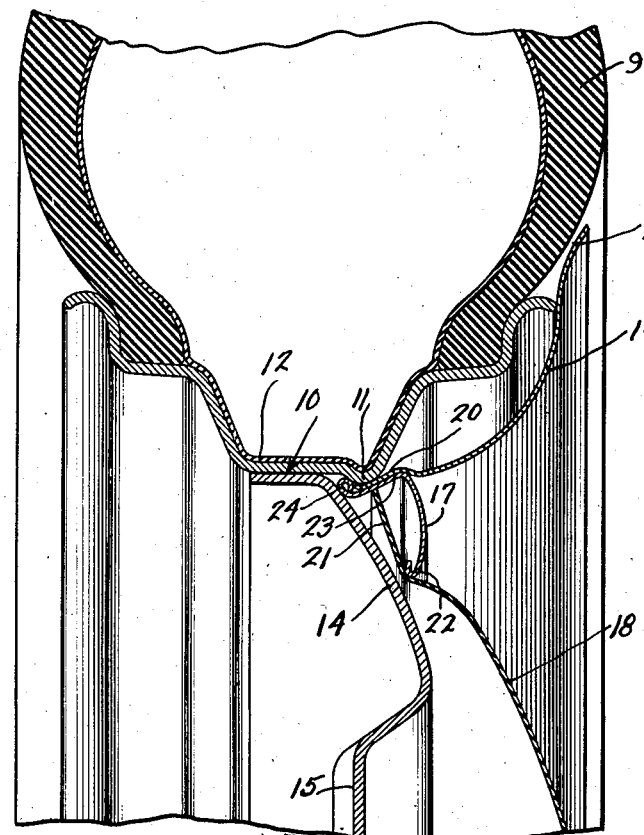
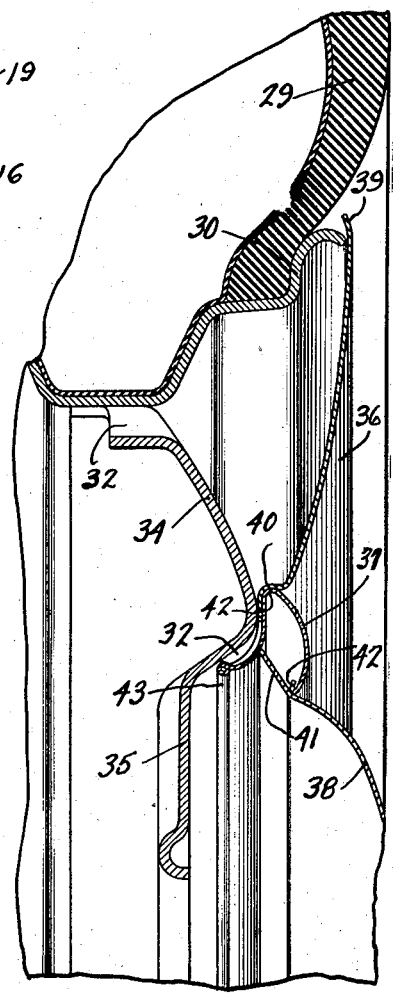
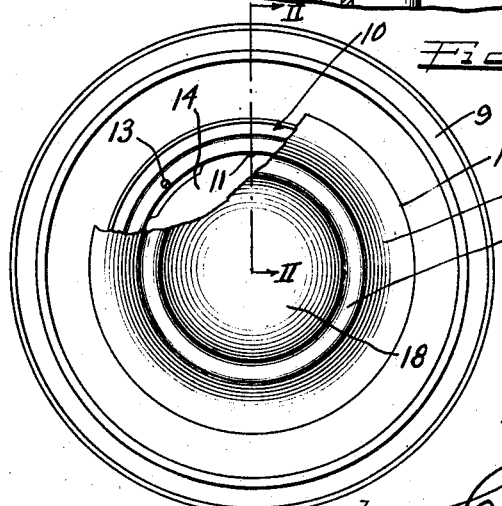
Inventor
GEORGE ALBERT LYON.
by Charles W. Hill
Attys.

Patented Oct. 9, 1945

2,386,235

UNITED STATES PATENT OFFICE 2,386,235

WHEEL STRUCTURE

George Albert Lyon, Allenhurst, N. J.

Application June 21, 1943, Serial No. 491,603

6 Claims. (Cl. 301—37)

This invention relates to a wheel structure, and more particularly to an improved wheel cover structure therefor.

An object of this invention is to provide a much simpler and lighter form of cover structure than has been available to the trade heretofore, so that the upsprung weight of a wheel may be substantially reduced.

Another object of this invention is to provide a simplified manner of connecting together multiple parts of a cover for a wheel, and in which either or both a trim ring and a hub cap may be used with a common attaching ring.

Still another object of this invention is to provide simplified means for retaining multiple parts of a cover on a wheel and for concealing their junction, as well as for ornamenting the cover.

A still further object of the invention resides in the provision of a cover which in its main parts is made of a light synthetic plastic material and which parts may readily be connected together by a relatively small metal ring which serves as a means for strengthening the cover as well as for retaining the cover on the wheel.

In accordance with the general features of this invention, there is provided in a wheel structure including a multi-flanged tire rim and body parts connected thereto, a wheel cover comprising concentric ring and hub cap members for disposition over the wheel rim and body respectively, and an intermediate ring for covering the junction of said members for holding them together and for detachably retaining them on a wheel.

Still another feature of the invention relates to forming of the ring and hub cap members of the above noted cover out of plastic material of such physical characteristics that the two cover parts are self-sustaining with regard to shape and yet have sufficient resiliency to cooperate properly with the intermediate retaining ring.

Another feature of the invention relates to the forming of the above referred to cover structure in such a manner that the outer cover ring of the cover will appear, in use, to constitute a part of the tire wall so that the tire will appear to extend clear down to the intermediate connecting ring of the cover.

An additional and further feature of the invention resides in the provision of the above referred to cover structure of ring and hub cap parts so constructed at their adjoining margin that each of them may be applied from the rear of the intermediate ring to a marginal portion of the intermediate ring by resiliently pressing such adjoining marginal portions of said wheel cover and hub cap part over the cooperating margins of the intermediate ring whereby the three elements are all held together resiliently in a common unit.

A further feature of the invention relates to the construction of the outer ring of the aforesaid cover structure whereby it may be manually flexed for the purpose of getting a pry-off tool therebehind and into engagement with the cover opposite the rigidifying intermediate ring when it is desired to pry the tire cover structure out of its retained cooperation with the wheel.

Another feature of the invention relates to the utilization of protuberances in the base flange of the tire rim for cooperating in holding the wheel cover on the wheel and also for the purpose of cooperating in preventing circumferential slippage or movement of the inner tube within the tire and rim.

Other objects and features of this invention will more fully appear from the following detail description taken in connection with the accompanying drawing which illustrates several embodiments thereof and in which:

Figure 1 is a side elevation of a wheel structure embodying the features of this invention in which the cover is partly broken away to show the protuberances on the tire rim and which protuberances cooperate in the retention of the cover;

Figure 2 is an enlarged fragmentary cross-sectional view taken on the line 2—2 of Figure 1, looking in the direction indicated by the arrows and showing how my novel, multi-part wheel cover is retained on the wheel; and Figure 3 is a fragmentary cross-sectional view corresponding to Figure 2 illustrating a modified structure in which the protuberance means is at the center of the wheel body instead of on the tire rim shown on the drawing.

The reference character 9 designates generally a conventional type of beaded tire having the usual inner tube 12. The tire and tube are mounted on a drop center type of tire rim so that the central inner portion of the inner tube is disposed radially inwardly of the bead and inside of the base flange of the wheel rim 10. The base flange is provided at regular intervals as desired with a plurality of radially inwardly projecting protuberances 11 which are formed by reason of depressions made in the base flange of the rim. These protuberances 11 cooperate in the retention of the wheel cover, to be hereinafter described, and in addition provide depressions in which portions of the inner tube 12 are adapted to extend and thus aid in preventing circumferential slip of the tube in the rim. The tube is also provided with the usual valve stem (Figure 1) which projects, as is customary, through a side flange of the drop center type of tire rim 10.

The metal tire rim 10 is anchored or secured in suitable manner to a load bearing part, spider or body part 14, having a centrally dished section to provide a bolt-on flange 15 which, as is well-known in the art, is adapted to be used in detachably bolting the wheel to a support on an axle or the like.

The cover of my invention comprises a plurality of concentrically arranged parts including an outer ring 16, an intermediate connecting ring 17 and a central hub cap part 18. The inner and outer parts 16 and 18 are made of any suitable material but I preferably make them of a synthetic plastic material having physical properties such that each of these parts are self-sustaining with regard to shape and yet have sufficient resiliency to resist permanent distortion. For example, the hub cap 18 will, upon accidental indenting of the same, as might incur when it strikes the curb in the use of the wheel, of its own accord, due to its resiliency, inherently flex back to its original contour. The same also holds true of the trim ring 16.

There are numerous plastics on the market that are suitable for use in the parts of my cover but I have obtained excellent results with thermoplastic products available on the market such, for example, as those known as ethyl cellulose products. In any event, the thermo-plastic material that is used must not only have the requisite ability to be form retaining and resistant to indenture but, in addition, must have resiliency so that the cover part in which it is used will always have the tendency to return to its given shape.

On the other hand, the intermediate connecting ring 17 which serves the triple purpose of connecting the two parts 16 and 18 together, concealing their joint, and providing means for the retention of the cover on the wheel should be made of a much more rigid material such, for example, as steel. I contemplate that excellent results may be obtained by making this intermediate ring 17 of stainless steel which lends itself to a high lustrous finish and will provide a very beautifying ornamental effect when used in conjunction with the adjoining plastic members 16 and 18.

The outer trim ring 16 is of a curved convex-concave cross-sectional shape and terminates at its outer periphery in a lip 19 by means of which the ring may be manually manipulated when it is desired to flex the ring bodily away from the rim so as to get access to the rear of the ring. For illustration, when it is desired to apply a pry-off tool to eject the cover from the wheel, the lip 19 may be manually engaged and pulled away from the tire so as to permit the tool to be inserted and engaged with the cover opposite the metal ring 17 and adjacent the bump 11. In this manner the cover may be easily ejected from the wheel without damaging the plastic parts 16 and 18.

Also in the event that the valve stem is wholly concealed by the cover ring 16 or, in other words, does not project through a hole in the cover ring, access may be had to the same for supplying air thereto by manually flexing the lip 19 of the ring 16 away from the tire. In some cases this action may be necessary where the valve stem is a short one but in other cases where the valve stem is relatively long so that it can project through a hole in the trim ring 16, it is not necessary to flex the lip 19 in the manner above described. I contemplate, however, in the present embodiment having the valve stem concealed by the trim ring 16.

The inner margin of the trim ring 16 is bent in an inclined, generally axial direction and is adapted to be applied from the rear of the ring 17 over the outer peripheral margin of the ring 17. In this regard it should be noted that the ring 17 is of a hollow construction and has a rearwardly projecting skirt 23 terminating radially outwardly in the outermost margin of the ring 17. The junction of this skirt 23 with the main body of the ring 17 defines a hump and it is over this hump that the shouldered marginal edge 20 of the body of the ring 16 is resiliently flexed to lock the trim ring 16 to the metal ring 17.

The innermost extremity of the skirt 23 of the metal ring is formed into a curled continuous edge 24 which is resilient so as to be adapted to be cammed over and behind the bump 11 into retaining cooperation therewith. The normal innermost diameter of the bumps 11 is slightly less than the outermost diameter of the bead 24 or of the extremity 24 so as to require flexing of the extremity 24 as the same is cammed over and behind the bumps by the act of pressing the cover axially onto the wheel. If it is so desired, the extremity 28 may be serrated to provide fingers instead of the continuous edge for the purpose of holding the cover on the wheel.

The outermost margin of the hub cap part 18 is provided with a radially inclined flange 21 which, at its junction with the main body of the hub cap, defines a seat in which the turned inner edge 22 of the metal ring 17 is adapted to seat. This hub cap part 18 may be likewise applied from the rear of the ring 17 by resiliently pressing it past the extremity 24 of the ring into the position shown in Figure 2 in which it is likewise locked to the ring as well as to the ring 16.

The hub cap 18 may, of course, be provided in the usual way with any suitable hub cap indicia such as the name of the automobile. Moreover, by reason of the physical properties of the plastic used in the ring 18, it follows that should the central part of the hub cap become dented it will immediately flex back to its original position on account of its inherent resiliency.

Thus, I have provided a three part cover in which a central metal ring holds two plastic cover members together by reason of their being snapped resiliently from the rear of the ring over the same into nested retained engagement therewith, which engagement is sufficiently permanent to hold the three parts together in a single unit. The entire unit is adapted to be held on the wheel by the flexible extremity 24 of the metal ring and moreover, the metal ring provides rigidity at the junction of the parts and at the point of the application of the retention force. In addition, the metal ring provides a metal backing for the application of a pry-off pressure when it is desired to forcibly eject the cover from the wheel.

Once the cover is on the wheel the resilient extremity or edge 24 of the metal ring 17 is disposed behind the bumps 11, as shown in Figure 2, and by reason of its tendency to want to return to its original shape prior to it being cammed over the bump, it resiliently grips the rear sides of the bumps to tightly pull the entire cover in against the wheel. In this condition the trim ring 16 is tightly held against the bumps 11 as well as against the outer edge of the rim adjacent the lip 19.

In Figure 3 I have illustrated a modification of the invention wherein substantially all of the features described above, in connection with the physical properties and characteristics of the cover of Figure 2, are present. The principal difference resides in the fact that instead of retaining the cover on bumps formed on the rim of the wheel the cover is retained on bumps formed on the body part.

In this form of the invention the tire 29 is mounted on the drop center tire rim part 30 of the wheel which is connected at spaced intervals to the metal body part or spider of the wheel leaving the usual air circulation openings 32 at the base of the rim. The central portion of the body part 34 is dished to provide a bolt-on flange 35 by means of which the wheel may be attached to an axle in a manner well-known to those skilled in the art.

The dished central portion of the body part 34 is provided with radially inwardly facing protuberances 32 which are similar in character to the protuberances 11 of the first described form insofar as the retention of the cover on the wheel is concerned.

The wheel cover in this embodiment of the invention, like the previously described one, comprises three parts, namely an outer plastic ring 36, an intermediate connecting metal ring 37 and a hub cap 38. These parts have the same physical properties and characteristics as the parts of the previously described form of the invention.

The plastic trim ring 36 has a slightly turned lip 39 adapted to overhang the outermost edge of the tire rim 30. It should be noted at this time that in both embodiments of the invention the flaring of the lip 19—39 is such as to keep it out of contact with the side wall of the tire. Should the tire become punctured so that it is bulbed outwardly into contact with the edge or lip, the lip can yield by reason of the resilient characteristics of the plastic ring.

The inner edge margin of the plastic ring 36 is provided with a shouldered flange 40, and is adapted to be resiliently sprung over the rearwardly turned portion 42 of the metal ring 37. In this form of the invention the ring 36, as in the first form, is snapped onto this metal ring 37 from the rear side of the same so that it is tightly held on the ring and there is no likelihood of it working loose in the use of the cover.

The central hub cap 38 has an inclined marginal portion 41 which, at its junction with the main body of the cap, defines a seat for the turned edge 42 of the ring 37. This marginal portion 41 is likewise adapted to be applied to the ring 37 by pressing it on to the ring from the rear side of the same. The resiliency of the material permits of this flexing of the portion 41 past the metal edge 43 of the ring and into retaining engagement with the turned inner edge 42 of the metal ring. The previously referred to inner edge 43 of the metal ring, is a continuous edge and is formed on the skirtlike margin 42 of the metal ring. It is adapted to be cammed over the bumps 32 and to the rear of the bumps into resilient press engagement therewith. As in the case of the first form of the invention, the inner diameter of the bumps 32 is normally slightly less than the outermost diameter of the edge 43 so as to require flexing of the edge in order for it to pass over and to the rear of the bumps. Moreover, when the edge is in retaining engagement with the bumps 32 it has a tendency to want to return to its initial diameter and as a consequence it is in stressed engagement with the bumps 32.

The operation and application of this form of cover is substantially the same as the cover previously referred to and hence no additional description of the same is necessary.

In concluding, it should be noted that a cover made in accordance with the principles of my invention and like either of the above described forms, may be made much lighter than existing hub cap and trim ring structures. For illustration, I found that I can make a three-part cover, such as that of my present invention, of a weight in the neighborhood of twelve ounces. In the existing hub cap and trim ring structures I find that the weight of the same is in the neighborhood of three times as much as that of my present structure. Thus my present structure constitutes a distinct advantage in so far as it enables the lessening of the unsprung weight on an automobile.

Furthermore, by reason of the plastic characteristics of the hub cap 18, that hub cap can be deflected by denting to an extent as much as two inches without resulting in permanent deformation of the same. This is a distinct advantage since it tends to increase the longevity of the cap in so far as its use on an automobile is concerned.

In both forms of the invention, by reason of the construction and location of the outer trim ring it is possible to cause that trim ring to appear to be a part of the side wall of a tire. Particularly is this true if the trim ring is given a white external finish, in which event it appears to be a white side wall part of the tire in which the white side wall extends clear down to the metal ring 17—37. A highly ornamental effect may be obtained by having the metal ring provided with a lustrous external finish which is contrasted against the finish of the two adjoining parts of the wheel cover.

It should be noted that in both forms of the invention the metal intermediate ring 17—37 may be used both with the trim ring and a hub cap or with either of these parts alone. If used with the trim ring alone, it provides the trim ring with an ornamental reinforcing metal ring at its inner periphery. On the other hand, if used with a hub cap alone, it provides the hub cap with an ornamental reinforcing ring at the outer periphery of the hub cap. Thus numerous different combinations are made possible with this structure of my invention, which is a highly desirable feature since it enables the car user to select the combination which he desires to use on the wheels of his automobile. If he desires only the trim ring, then he can omit the hub cap and use a conventional hub cap at the center of the wheel, as is now the practice. On the other hand, if he desires only the hub cap, then he can omit the trim ring part and substitute my novel hub cap and reinforcing outer ring for the conventional hub cap.

Furthermore, if he uses both the trim ring and hub cap connected by my novel intermediate ring, then there is available a single entity which is applicable by a single snap-on operation to the wheel. The fact that the two cover parts are applied to the intermediate ring from the rear thereof insures that when the unit is on the wheel these parts will be retained together.

I claim as my invention:

1. In a wheel structure including a multi-flanged tire rim and a wheel body connected thereto, a wheel cover comprising concentric ring and hub cap members for disposition over the wheel rim and body respectively, and an intermediate ring for covering the adjacent margins of said members, for holding them together and for detachably retaining them on the wheel, said wheel rim having a base flange provided with radially inwardly projecting means facing said wheel body, and said intermediate ring having rearwardly projecting resilient means constructed and arranged to be resiliently cammed over and into cover retaining engagement with said projecting means, said projecting means comprising a plurality of depressions at the junction of the base and side flange of the rim, each of which depressions forming a protuberance arranged in a common circle, the innermost diameter of which is less than the outermost diameter of said retaining means on the ring whereby said retaining means on the ring must be flexed as it is pressed over and behind said protuberances and whereby said retaining means is not permitted to return completely to its normal undeflected position and hence is under tension when retainingly cooperating with the protuberances.

2. In a wheel structure including a multi-flanged tire rim and a wheel body connected thereto, a wheel cover comprising concentric ring and hub cap members for disposition over the wheel rim and body respectively, and an intermediate ring for covering the adjacent margins of said members, for holding them together and for detachably retaining them on the wheel, said intermediate ring having its outer edge turned back upon itself so as to define a seat over which said ring member is adapted to be resiliently pressed from the rear of the ring, said intermediate ring also having an inner turned edge behind which the outer margin of the hub cap is adapted to extend and to be applied from the rear of the cover, said concentric ring and hub cap parts of the cover being made of thin, light-weight plastic material and said intermediate ring being made of thin, light-weight sheet metal material and being of relatively little width as compared to the over-all diameter of the cover whereby said cover may have a weight of approximately one-third of that of the conventional metal hub cap and trim ring.

3. In a wheel structure including a multi-flanged tire rim and a wheel body connected thereto, a wheel cover comprising a hub cap made of a plastic material having the physical property of being self-sustaining with regard to shape and also having sufficient resiliency to enable it to resist permanent deformation, and an outer ring of more rigid material than that of the hub cap to which the hub cap is detachably attached and which ring is provided with means for detachably holding itself and the hub cap on the wheel, said ring having rearwardly projecting resilient means adapted to be resiliently deflected over projecting means on one of the wheel parts for retaining the hub cap on the wheel.

4. In a cover assembly for disposition over the outer side of a vehicle wheel, a radially outer annular cover member and a radially inner circular cover member for disposal concentrically relative to one another, said cover members being formed from plastic material so as to be locally flexible, yet self-sustaining as to form whereby they will snap back into original configuration when distorting pressures are relieved therefrom, and retaining means for securing said cover members in concentricity with respect to one another and in detachable relationship with the wheel, said retaining means including a relatively strong, rigid annulus provided with a generally axially inwardly extending circular leg and a generally radially extending circular leg, both of said cover members being formed at the adjacent peripheries thereof for interlocking relationship with the axially extending leg of the retaining annulus and at least one of said cover members having a radially intermediate part formed to abut the radial extremity of the radially extending leg of the retaining annulus to be supported thereby.

5. In a cover structure for a wheel including a tire rim and a body part having cover retaining means, a cover for said wheel parts comprising a plurality of separate concentric portions with adjoining margins formed to provide an annular recess between said portions opposite the body part and a retaining hollow bead in said recess with opposite inner and outer margins bearing against said cover portions, one of said bead margins having an axially extending projection between the cooperable margins of said cover portions for engagement with said cover retaining means to the rear of the cover.

6. The structure of claim 5 further characterized by both of said cover portions being made of flexible material resiliently deflectable without permanent distortion and yet self-sustaining as to form, and by said bead being made of comparatively more rigid material for reinforcing said cover portions at their junctions and at the place of attachment of the cover to the wheel.

GEORGE ALBERT LYON.